United States Patent
Saraf

(10) Patent No.: US 12,314,713 B2
(45) Date of Patent: May 27, 2025

(54) METHOD AND SYSTEM FOR MANAGING PRODUCT EXTENSIONS

(71) Applicant: INFOSYS LIMITED, Bangalore (IN)

(72) Inventor: Vishvajeet Ramesh Saraf, Bangalore (IN)

(73) Assignee: Infosys Limited, Bangalore (IN)

( * ) Notice: Subject to any disclaimer, the term of this patent is extended or adjusted under 35 U.S.C. 154(b) by 86 days.

(21) Appl. No.: 18/129,378

(22) Filed: Mar. 31, 2023

(65) Prior Publication Data

US 2024/0296046 A1  Sep. 5, 2024

(30) Foreign Application Priority Data

Mar. 31, 2023  (IN) .............................. 202341024950

(51) Int. Cl.
*G06F 9/44* (2018.01)
*G06F 3/0482* (2013.01)
*G06F 3/0484* (2022.01)
*G06F 8/30* (2018.01)
*G06F 8/60* (2018.01)
*G06F 8/76* (2018.01)
*G06F 11/3668* (2025.01)

(52) U.S. Cl.
CPC .............. *G06F 8/76* (2013.01); *G06F 3/0482* (2013.01); *G06F 3/0484* (2013.01); *G06F 8/30* (2013.01); *G06F 8/60* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 9,817,966 | B2 * | 11/2017 | Surti | ....................... G06F 9/541 |
| 12,014,339 | B1 * | 6/2024 | Bowers | ................. G06Q 40/06 |
| 2014/0068552 | A1 * | 3/2014 | Szocs | ........................ G06F 8/41 |
| | | | | 717/108 |
| 2015/0205594 | A1 * | 7/2015 | Pruessmann | .............. G06F 8/65 |
| | | | | 717/172 |
| 2017/0344227 | A1 * | 11/2017 | Stoicov | ..................... G06F 8/20 |
| 2022/0222089 | A1 * | 7/2022 | Joshi | ....................... G06F 9/547 |
| 2022/0382525 | A1 | 12/2022 | Kaitha | |

OTHER PUBLICATIONS

Europe Patent Application No. 23166241.2, Extended European Search Report, dated Sep. 20, 2023.

(Continued)

*Primary Examiner* — Qamrun Nahar
(74) *Attorney, Agent, or Firm* — Finnegan, Henderson, Farabow, Garrett & Dunner LLP

(57) ABSTRACT

This disclosure relates to a method and a system for managing extensions of a product. The method includes determining a set of extensions associated with the product. The set of extensions includes a set of existing extensions and a set of potential extensions. The method further includes receiving a user selection corresponding to an extension from the set of extensions. The method further includes comparing the extension with the set of existing extensions. The method further includes generating a boilerplate code assembly corresponding to the extension in response to comparing. The boilerplate code assembly is generated based on a definition language template, and a business logic.

18 Claims, 8 Drawing Sheets

(56) References Cited

OTHER PUBLICATIONS

Oltrogge Marten et al: "The Rise of the Citizen Developer: Assessing the Security Impact of Online App Generators", 2018 IEEE Symposium on Security and Privacy (SP), IEEE, May 20, 2018 (May 20, 2018), pp. 634-647, XP033377758, DOI: 10.1109/SP.2018.00005 [retrieved on Jul. 23, 2018].
IBM: "Patterns: Model-Driven Development Using IBM Rational Software Architect", Internet Citation, Dec. 6, 2005 (Dec. 6, 2005), XP007904115, Retrieved from the Internet: URL:http://www.redbooks.ibm.com/abstracts/sg247105.html [retrieved on Feb. 20, 2008].
Eelco Visser Ed—Lee Seong-Whan et al: "WebDSL: A Case Study in Domain-Specific Language Engineering", Jul. 2, 2007 (Jul. 2, 2007), SAT 2015 18th International Conference, Austin, TX, USA, Sep. 24-27, 2015; [Lecture Notes in Computer Science; Lect.Notes Computer], Springer, Berlin, Heidelberg, pp. 291-373, XP019109127, ISBN: 978-3-540-74549-5.

* cited by examiner

METHOD AND SYSTEM FOR MANAGING PRODUCT EXTENSIONS

This application claims priority to Indian Patent Application No. 202341024950, filed on Mar. 31, 2023, which is hereby incorporated by reference in its entirety

FIELD

This disclosure relates generally to software extensions, and more particularly to a method and a system for managing extensions of a product.

BACKGROUND

Products (i.e., software products) and platforms (i.e., software platforms) designed for various industrial domains, such as retail, insurance, banking, etc. are created on the assumption that the essential functionalities will be included, however each client (product user) needs to modify the designed product or platform according to their organizational requirements. The customization of the designed product or platform according to their organizational requirements is often time-consuming and can involve changes to the core product. An alternative way for enabling customization of the product and the platform is to design the core product such that it is configurable and extensible. However, creating extensions for the product or the platform is a specialized job that is normally performed by systems integrators.

Currently, majority of the product firms provide manuals, sample code snippets, video tutorials, and trainings to demonstrate techniques and patterns associated with extending features (i.e., core product extensions) of the core product. Further, correct interpretation of information provided about extension framework & patterns in these kinds of artefacts, depend upon skill and experience of system integrators team that implements these product extensions. However, this approach of interpreting information may result into various quality problems, prolonged solution performance issues, and schedule delays. Further, there may be scenarios where the extension may be incorrectly implemented within the product. Due to this incorrect extension implementation of a new version i.e, an upgraded version of the core product upgrade may not work appropriately, thereby impacting brand image & goodwill of the core product. Moreover, manual tracking of all customer-specific extensions and verifying extension quality may require a significant amount of time.

The major drawback therefore is that most of the work is manual and is based on interpretation of information by human, and prone to human error, which could result in erroneous extension development, and in worst-case scenarios, impacting the production environment where implementation error ultimately impacts the reliability of entire core product implementation. Moreover, construction of certain extension scenarios may require numerous extensible components or points, which would need extensive testing to validate. Further, as implementation team (i.e., the system integrator team) attempted to build several extension based on their own interpretation, the currently used fragmented approach which is mostly focused on documentation and manual process may further increases possibility of errors. Altogether, the current approaches only allows creation of extensions for the core product, however, its review and impact analysis are left to system integrators. There is, therefore, a need in the present state of art, for techniques to address the problem of manual generation and review of extensions by system integrators.

SUMMARY

In one embodiment, a method for managing extensions of a product is disclosed. In one example, the method may include determining a set of extensions associated with the product. It should be noted that the set of extensions may include a set of existing extensions and a set of potential extensions. The method may include receiving a user selection corresponding to an extension from the set of extensions. The method may include comparing the extension with the set of existing extensions. The method may include generating a boilerplate code assembly corresponding to the extension in response to comparing. It should be noted that the boilerplate code assembly may be generated based on a definition language template and a business logic.

In one embodiment, a system for managing extensions of a product is disclosed. In one example, the system may include a processor and a computer-readable medium communicatively coupled to the processor. The computer-readable medium may store processor-executable instructions, which, on execution, may cause the processor to determine a set of extensions associated with the product. It should be noted that the set of extensions may include a set of existing extensions and a set of potential extensions. The processor-executable instructions, on execution, may further cause the processor to receive a user selection corresponding to an extension from the set of extensions. The processor-executable instructions, on execution, may further cause the processor to compare the extension with the set of existing extensions. The processor-executable instructions, on execution, may further cause the processor to generate a boilerplate code assembly corresponding to the extension in response to comparing. It should be noted that the boilerplate code assembly may be generated based on a definition language template and a business logic.

In one embodiment, a non-transitory computer-readable medium storing computer-executable instructions for managing extensions of a product is disclosed. In one example, the stored instructions, when executed by a processor, cause the processor to perform operations including determining a set of extensions associated with the product. It should be noted that the set of extensions may include a set of existing extensions and a set of potential extensions. The operations may further include receiving a user selection corresponding to an extension from the set of extensions. The operations may further include comparing the extension with the set of existing extensions. The operations may further include generating a boilerplate code assembly corresponding to the extension in response to comparing. It should be noted that the boilerplate code assembly may be generated based on a definition language template and a business logic.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
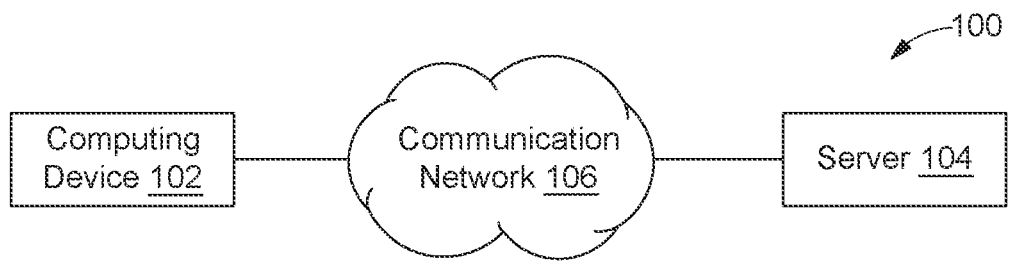
FIG. 1 illustrates a block diagram of an environment for managing extensions of a product, in accordance with an exemplary embodiment of the present disclosure.

FIG. 1 is a diagram that illustrates an environment 100 for managing extensions of a product, in accordance with an exemplary embodiment of the present disclosure.

The environment 100 may include a computing device 102 configured for managing extensions of the product. Examples of the computing device 102 may include, but is not limited to, a smartphone, a laptop, a desktop, a tablet, and the like. In an embodiment, the product may correspond to a software product or a software application. In some another embodiment, the product may be a software platform. As will be appreciated, the product may belong to any industrial domain, such as retail, insurance, banking, telecom, and the like. In addition, the extensions of the product may correspond to a functionality that adds extra feature to already existing product. In other words, the extensions may be defined as a small software program that is configured to enhance or extend capabilities of the already existing product.

As will be appreciated, in order to manage the extensions of the product computing, the computing device 102 may access an extensions configuration utility associated with the product. Further, the computing device 102, may receive the extensions configuration utility associated with the product during a release of the product. In an embodiment, the extensions configuration utility associated with the product may be received by the computing device 102 from a server 104. In an embodiment, the computing device 102 may interact with the server 104 via a communication network 106. Examples of the communication network 106 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. In an embodiment, the communication network 106 may facilitate data exchange between the computing device 102 to the server 104.

In an embodiment, in order to manage the extensions of the product, the computing device 102 may be configured to determine a set of extensions associated with the product. In an embodiment the set of extensions may include a set of existing extensions and a set of potential extensions. In particular, the computing device may determine the set of existing extensions and the set of potential extensions using the extensions configuration utility. In an embodiment, each of the set of existing extensions may correspond to an extension that is developed by a product development team (e.g., software developers) of the product. In other words, the development team that develops the product may create extensions for the product based on configurations of the product. The set of existing extensions may be deployed by organizations (business entities) based on their organizational requirements. In addition, each of the set of existing extensions and extension points may be configured by the product developed team in a definition language template, i.e., pre-defined domain specific definition language template used by the product development team while product manufacturing. Further, each of the set of potential extensions may correspond to an extension that is possible to be generated for the product based on configurations of the product and the configurations of organizations device (such as desktop, tablet, laptop, etc.) to which the product is integrated with.

Once the set of extensions corresponding to the product is determined, then, the computing device 102 may be configured to receive a user selection corresponding to an extension from the set of extensions. In order to receive the user selection for the extension, initially, the computing device 102 may present (or render) each of the set of extensions to a user (e.g., a system integrator) via a Graphical User Interface (GUI) (not shown) of the computing device 102. In an embodiment, the GUI may enable rendering of the set of extensions to the user in an organized manner as an extensions scenario library.

Upon presenting the set of extensions on the GUI, the user may select the extension from the set of extensions. In an embodiment, the user may select the extension based on his requirement corresponding to a functionality that the user wants to extend of the product. Further, in order to select the extension from the set of extensions, the computing device 102 may provide navigation to the user for guiding the user to select the extension via the GUI. In an embodiment, the navigation may be provided to the user based on an Artificial Intelligence (AI) model (not shown) communicatively coupled to the computing device 102. As will be appreciated, the guided navigation may enable the user to easily select the extension based on his requirement by restricting the user to think within a defined boundary of standards.

Further, upon receiving the user selection, the computing device 102 may be configured to compare the extension with the set of existing extensions. Further, based on the comparison, in one embodiment, the computing device 102 may be configured to identify a duplicate extension from the set of existing extensions. In other words, the extension (i.e., the extension selected by the user may be compared with pre-deployed extensions (i.e., the set of existing extensions)). In an embodiment, the duplicate extension may correspond to an extension that may be already built (i.e., a pre-deployed extension) and deployed by system integrator team. In case, when the duplicate extension corresponding to the extension selected by the user is identified, then the computing device 102 may generate an alert for the duplicate extension. Further, the generated alert may be presented to the user via the GUI of the computing device 102. In an embodiment, the alert may indicate that the duplicate extension is same as the extension selected by the user.

In another embodiment, based on the comparison, the computing device 102 may be configured to determine a degree of overlap between the extension and the set of existing extensions. As will be appreciated, the degree of overlap between the extension and the set of existing extensions may be determined by identifying overlapping components between components of the extension with a set of components associated with each of the set of existing extensions. In other words, the degree of overlap may be determined based on similarities between the extension and the set of existing extensions. Upon determining the degree of overlap, the computing device 102 may be configured to identifying one or more alternative extensions corresponding to the extension. The one or more alternative extensions corresponding to the extension may be identified based on the determined degree of overlap and a pre-defined overlap threshold.

By way of an example, suppose the pre-defined overlap threshold may be set for 30 degrees. In this case, upon determining the degree of overlap between the extension and the set of existing extensions to be above 30 degrees, the computing device 102 may be configured to identify one or more alternative extensions corresponding to the extension. In an embodiment, each of the one or more alternative extensions may correspond to an extension that can be deployed in place of the extension. In other words, each of the one or more alternative extensions may correspond to an extension that may enable the user to extend functionality of the product similar to the extension. In some embodiment, based on the determined degree of overlap and the pre-defined overlap threshold, the duplicate extension corresponding to the extension may be identified by the computing device 102.

Further, upon identifying the one or more alternative extensions, the computing device 102 may be configured to present the one or more alternative extensions to the user via the GUI. In other words, the one or more alternative extensions identified corresponding to the extension may be rendered to the user via the GUI of the computing device 102. Further, based on the rendering, the user may be able to select an extension, from the one or more alternative extensions based on his requirement, via an Input device (not shown) associated with the computing device 102. Examples of the Input device may include, but are not limited to, a keyboard, a joystick, a mic, a mouse, a tight pen, and the like.

In yet another embodiment, based on the comparison, when no duplicate extension is identified from the set of existing extensions corresponding to the extension based on the degree of overlap determined between the extension and the set of existing extensions, then the computing device 102 may be configured to generate a boilerplate code assembly corresponding to the extension. As will be appreciated, the computing device 102 may be configured to generate the boilerplate code assembly corresponding the extension, based on a result of comparison. By way of an example, when no duplicate extension is identified and the degree of overlap is determined to be below the pre-defined overlap threshold, then the computing device 102 may generate the boilerplate code assembly. By way of another example, in some embodiment, the computing device 102 may generate the boilerplate code assembly for the extension from the one or more alternative extensions presented to the user via the GUI. In an embodiment, the boilerplate code assembly may be generated based on the definition language template and a business logic Further, during generation of the boilerplate code assembly corresponding to the extension, the computing device 102 may be configured to embed an auditability code snippet with the boilerplate code assembly. In an embodiment, the auditability code snippet may include an observability code snippet. Further, the auditability code snippet may be embedded by the computing device 102, to automatically verify deployment and functioning of the boilerplate code assembly within the product. A method of verifying the deployment of the boilerplate code assembly within the product is further explained in detail in conjunction with FIG. 8.

Once the boilerplate code assembly corresponding to the extension is generated by the computing device 102, then the computing device 102 may be configured to deploy the boilerplate code assembly in intended deployment environment/client ecosystem. This is further explained in detail in conjunction with FIGS. 4 to 7.

Figure 2:
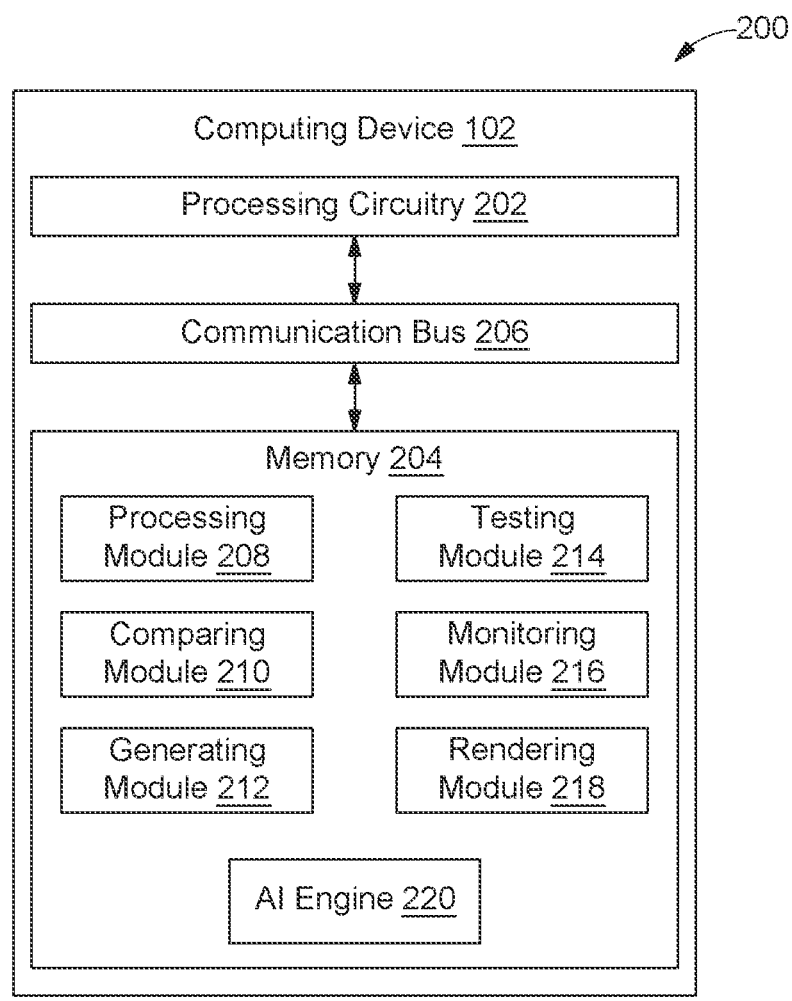
FIG. 2 illustrates a block diagram of a computing device configured for managing extensions of a product, in accordance with an exemplary embodiment of the present disclosure.

FIG. 2 is a block diagram 200 that illustrates a computing device 102 configured for managing extensions of a product, in accordance with an exemplary embodiment of the present disclosure. FIG. 2 is explained in conjunction with FIG. 1. The computing device 102 may include a processing circuitry 202, and a memory 204 communicatively coupled to the processing circuitry 202 via a communication bus 206.

The memory 204 may store various data that may be captured, processed, and/or required by the computing device 102. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

The memory 204 may also store processor-executable instructions. The processor-executable instructions, when executed by the processing circuitry 202, may cause the processing circuitry 202 to implement one or more embodiments of the present disclosure such as, but not limited to, determining a set of extensions, receiving a user selection corresponding to an extension, comparing the extension, generating a boilerplate code assembly corresponding to the extension, and the like. The memory 204 may include a processing engine 208, a comparing engine 210, a generating engine 212, a testing engine 214, a monitoring engine 216, a rendering engine 218, and an AI engine 220. The memory 204 may also include a data store (not shown in FIG. 2) for storing data and intermediate results generated by the engines 208-220.

The processing engine 208 may be configured for determining the set of extensions corresponding to the product through the processing circuitry 202. In an embodiment, the product may correspond to a software product or a software application. In some another embodiment, the product may be a software platform. As will be appreciated, the product may belong to any industrial domain, such as retail, insurance, banking, telecom, and the like. In addition, each of the set of extensions of the product may correspond to a functionality that adds extra feature to already existing product. In other words, the extensions may be defined as a small software program that is configured to enhance or extend capabilities of the already existing product.

In an embodiment, the set of extensions determined for the product may include the set of existing extensions and the set of potential extensions. In an embodiment, each of the set of existing extensions may correspond to an extension or extension point that is developed by a product development team (e.g., software developers) for the product during product manufacturing. Further, each of the set of existing extensions and extension points may be created by the development team in the definition language template, i.e., the pre-defined domain specific definition language template defined by the development team. Further, each of the set of potential extensions may correspond to an extension that is possible to be generated for the product based on configurations of the product, the configurations of organizations device (e.g., desktop, laptop, etc.) to which the product is integrated with and the pre-defined domain specific definition language template. Once the set of extensions and extension points are determined for the product, the set of extensions may be presented to the user (e.g., a system integrator) via the GUI (not shown) of the computing device 102. Further, upon presenting the set of extensions, the user selection corresponding to the extension from the set of extensions may be received from the user. In an embodiment, the user may provide the user selection via the GUI of the computing device 102.

Further, upon receiving the user selection corresponding to the extension, the comparing engine 210 may be configured to compare the extension with the set of extension in client ecosystem/deployment environment through the processing circuitry 202. In an embodiment, the comparing engine 210 may compare the extension with the set of existing extensions to identify any duplicate extension corresponding to the extension from the set of extensions, or to identify one or more alternative extensions corresponding to the extension. In an embodiment, the duplicate extension or the one or more alternative extensions may be identified by determining the degree of overlap between the extension and the set of existing extensions. In particular, the comparing engine 210 may perform comparison of the extension selected by the user for the product with the set of existing extensions to ensure none of the set of existing extensions is same or in any way similar to the selected extension. This is done to avoid re-deployment/overriding of the same extension that already exists corresponding to the product.

Further, based on the comparison, the comparison engine 210 may be configured to generate a result of the comparison. In an embodiment, the result generated based on the comparison may be the alert that indicates that the duplicate extension exists corresponding to the extension, or the one or more alternative extensions identified corresponding to the extension based on the determined degree of overlap and the pre-defined overlap threshold. Further, the result of the comparison may be rendered to the user via the GUI. Upon rendering the result, the user may be able to perform suitable action. By way of an example, based on the rendering, the user may use an alternate extension corresponding to the extension for configuring the functionality of the product. By way of another example, the user may select an alternative extension from the one or more alternative extensions corresponding the extension. In another embodiment, the result may indicate that no duplicate extension is identified corresponding to the extension, and the degree of overlap between the extension with the set of existing extensions is below the pre-defined overlap threshold.

In case no duplicate extension is identified and the degree of overlap determined is below the pre-defined overlap threshold, the in this case, the generating engine 212 may be configured to generate the boilerplate code assembly corresponding one of the extension (or the alternative extension) selected by the user. The generating engine 212 may generate the boilerplate code assembly through the processing circuitry 202. In an embodiment, the boilerplate code assembly may be generated based on the definition language template and the business logic. Further, in order to generate the boilerplate code assembly, the generating engine 212 may be configured to embed the auditability and observability code snippet within the boilerplate code assembly.

In an embodiment, for generating the boilerplate code assembly, the generating engine 212 may be configured to generate one or more components corresponding to the extension through the definition language template. The one or more components may be generated based on the business logic. In other words, the one or more components may need further enrichment based on the business logic. Further, each of the one or more components may correspond to a new class generated corresponding to the extension of the product. In order to generate the one or more components, the generating engine may receive an input corresponding to the business logic, based on user requirements. The input may be provided by the user based on comments and guidelines provided in the boilerplate code assembly. Once the one or more components corresponding to the extension are generated, then the generating engine 212 may be configured to assemble each of the one or more components for generating the boilerplate code assembly for the extension.

Further, the testing engine 214 may be configured to test the boilerplate code assembly generated corresponding to the extension of the product. In an embodiment, the test may correspond to a sanity test. Further this sanity test may be performed in real-time while generating the boilerplate code assembly corresponding to the extension. As will be appreciated, the sanity test may be performed to ensure that the boilerplate code assembly generated for the extension is working properly without any bugs. Based on an outcome of the testing, the testing engine 214 may be configured to generate the boilerplate code assembly. In particular, based on the sanity test performed by the testing engine 214, when the boilerplate code assembly is working properly without any errors, then the testing engine 214 may generate the boilerplate code assembly and deploy it in intended deployment environment/client ecosystem.

Once the deployment of the extension is done in client ecosystem/intended deployment environment, the monitoring engine 216 may be configured to verify the deployment and functioning of the boilerplate code assembly. In order to verify the deployment and functioning of the boilerplate code assembly, the monitoring engine 216 may be configured to track communication of the extension with a plurality of components associated with the product, based on the auditability code snippet. In particular, the communication of the extension with the plurality of components may be tracked by based on the observability code snippet present within the auditability code snippet. As will be appreciated, this will enable reviewers to review changes made (i.e., the functionality extended) as part of the extensions via audit trails generated due to the auditability code snippets and help to track compliance of assembly with standards and processes. It should be noted that the plurality of components of the product may correspond to classes build during development of the product. In an embodiment, each class of the product may be a functionality of the product.

Further, the monitoring engine 216 may be configured to generate a notification based on the tracking. The notification may be indicative of one of a successful extension deployment or functioning, or an unsuccessful extension deployment and functioning. In one embodiment, the notification indicating the successful extension deployment and functioning is generated when the extension may appropriately function in conjunction with the plurality of components of the product. In another embodiment, the notification indicating the unsuccessful extension deployment and/or functioning is generated when the extension does not function properly in conjunction with the plurality of components of the product. As will be appreciated, the monitoring engine 216 my be configured to monitor the communication of the extension with the plurality of components to observe and report any issue in the communication of the extension with the plurality of components, to the user.

Further, the rendering engine 218 may be configured to render one or more intermediate results or a final result via the GUI. By way of an example, the one or more intermediate results may include, the set of extensions determined, the alert generated based on the comparing, the one or more alternative extensions generated corresponding to the extension, the result of the sanity test performed for the boilerplate code assembly of the extension. By way of another example, the final result may correspond to the notification indicative of the successful extension deployment and functioning and the unsuccessful extension deployment and functioning.

The AI engine 220 may be configured to guide the user for selecting the extension from the set of extensions. In particular, in order to guide the user, the AI engine 220 may provide the navigation to the user for selection of the extension. By way example, the AI engine 220 may provide navigation with respect to selection of the extension based on a relative cost required for generating and deploying the extension, time-period require for generating the extension, physical configurations required for generating and deploying the extension, and the like. Further, the AI engine 220 may be configured to generate the alert corresponding to the duplicate extension if the pre-deployed extension (i.e., the existing extension) in client ecosystem matches with the extension selected by the user. In addition, the AI engine 220 may be configured to identify the one or more alternative extensions corresponding to the extension.

It should be noted that all such aforementioned engines 208-220 may be represented as a single module or a combination of different modules. Further, as will be appreciated by those skilled in the art, each of the engines 208-220 may reside, in whole or in parts, on one device or multiple devices in communication with each other. In some embodiments, each of the engines 208-220 may be implemented as dedicated hardware circuit comprising custom application-specific integrated circuit (ASIC) or gate arrays, off-the-shelf semiconductors such as logic chips, transistors, or other discrete components. Each of the engines 208-220 may also be implemented in a programmable hardware device such as a field programmable gate array (FPGA), programmable array logic, programmable logic device, and so forth. Alternatively, each of the engines 208-220 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for managing extensions. For example, the exemplary computing device 102 may manage the extension by the processes discussed herein. In particular, as will be appreciated by those of ordinary skill in the art, control logic and/or automated routines for performing the techniques and steps described herein may be implemented by the computing device 102 either by hardware, software, or combinations of hardware and software. For example, suitable code may be accessed and executed by the one or more processors on the computing device 102 to perform some or all of the techniques described herein. Similarly, application specific integrated circuits (ASICs) configured to perform some or all of the processes described herein may be included in the one or more processors on the computing device 102.

Figure 3:
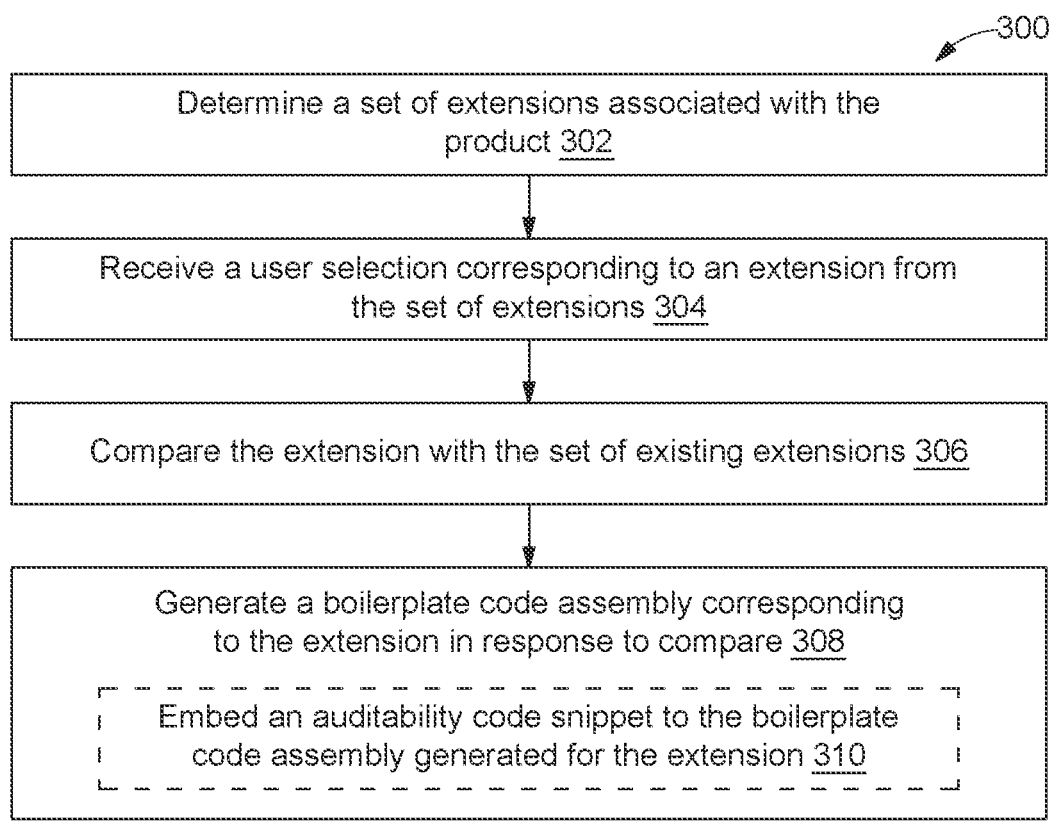
FIG. 3 illustrates a flow diagram of an exemplary process for managing extensions of a product, in accordance with an exemplary embodiment of the present disclosure.

FIG. 3 is a flow diagram that illustrates an exemplary process 300 for managing extensions of a product, in accordance with an exemplary embodiment of the present disclosure. FIG. 3 is explained in conjunction with FIGS. 1 and 2. In an embodiment, the process 300 may be implemented by the computing device 102.

In order to manage the extensions of the product, initially, at step 302, a set of extensions associated with the product may be determined. In an embodiment, the set of extensions may include a set of existing extensions and a set of potential extensions. It should be noted that the product may correspond to a software product or a software application. In some embodiment, the product may be a software platform. The product may belong to any industrial domain, such as retail, insurance, banking, telecom, and the like. Further, each of the set of extensions may correspond to an extended functionality of the product. In an embodiment, the extended functionality may correspond to an extra feature that is added to an already existing product. In particular, each of the set of extensions may be defined as a small software program that is configured to enhance or extend capabilities of the already existing product. Further, each of the set of existing extensions may correspond to an extension that is pre-defined by the product development team for the product during product manufacturing. In an embodiment, each of the set of existing extensions may be pre-defined by the product development team in a definition language template. In an embodiment, the definition language template may be a pre-defined domain specific definition language template that was used at the time of manufacturing of the product. Further, each of the set of potential extensions may correspond to an extension that is possible to be generated for the product based on configurations of the product and the configurations of organization device (e.g., the computing device 102) to which the product is integrated with.

Once the set of extensions corresponding to the product is determined, then at step 304, a user selection corresponding to an extension from the set of extensions. As will be appreciated, in some embodiment, the user selection may be received corresponding to an extension point from a set of extensions points. In an embodiment, the user selection corresponding to the extension may be received from a user (e.g., a system integrator). A method of receiving the user selection corresponding to the extension is further explained in detail in conjunction with 4. In an embodiment, the user selection corresponding to the extension may be received based on user requirement corresponding to functionality that the user is interest in enhancing.

Further, upon receiving the user selection, at step 306, the extension selected by the user may be compared with the set of existing extensions in client ecosystem/intended servers. In an embodiment, the selected extension may be compared with the set of existing extensions to avoid re-deployment of same extension for the product or overriding already deployed extension. A method of comparing the selected extension with the set of existing extensions is further explained in detail in conjunction with FIG. 5 and FIG. 6. Further, based on the comparison, when none of the set of existing extensions matches with the extension selected by the user, then at step 308, a boilerplate code assembly corresponding to the extension may be generated in response to comparing. In an embodiment, the boilerplate code assembly may be generated based on the definition language template and a business logic. In an embodiment, in order to generate the boilerplate code assembly corresponding to the extension, an input corresponding to the business logic may be received from a user based on user requirements. In other order words, the user may provide the input corresponding to the business logic based on the extension that the user might be interested in deploying.

By way of an example, when the product is associated with an insurance domain, then the business scenario that the user might be interested in extending in an existing insurance product, i.e., an insurance application may be a death claim category. In this scenario, the input corresponding to the business scenario provided by the user may be 'generate death claim category'. As will be appreciated, in order to provide the input corresponding to the business scenario, the user may have to manually type a command, for example, 'generate the death claim category' at a pre-defined location within the generated boilerplate code assembly. As will be appreciated, the input corresponding to the business scenario may be provided by the user based on comments and guidelines provided in the boilerplate code assembly.

Further, during generation of the boilerplate code assembly, at step 310, an auditability code snippet may be embedded corresponding to the boilerplate code assembly generated for the extension. It should be noted that, the auditability code snippet may include an observability code snippet. In an embodiment, the auditability code snippet may be embedded to verify conformance of the extension to applicable quality gate standards and processes defined. In an embodiment, the observability code snippet may be embedded to measure current status of the extension post deployment. A method of generating the boilerplate code assembly corresponding to the extension is further explained in detail in conjunction with FIG. 7. Further, a method of verifying the deployment of the boilerplate code assembly has been further explained in detail in conjunction with FIG. 8.

Figure 4:
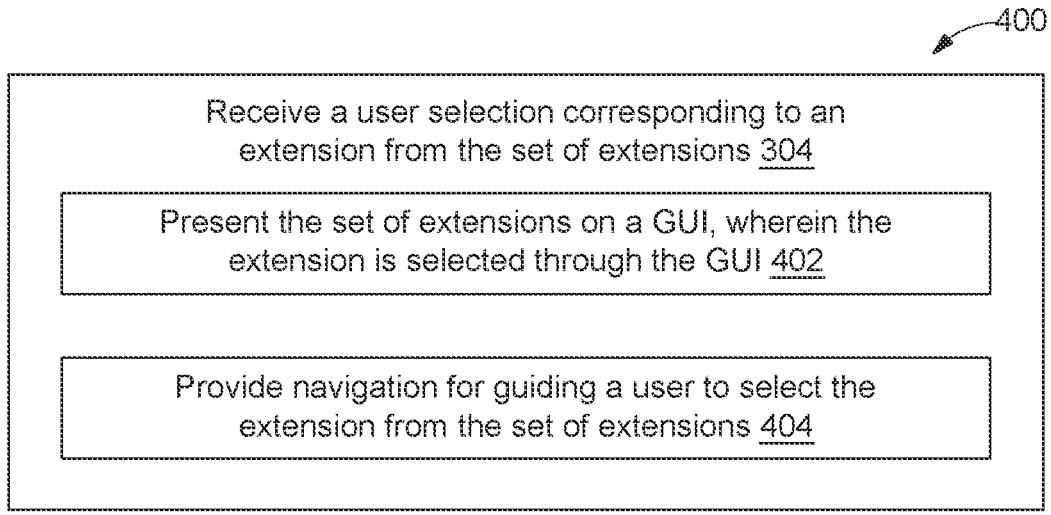
FIG. 4 illustrates a flow diagram of an exemplary process of receiving a user selection corresponding to an extension from a set of extensions, in accordance with an exemplary embodiment of the present disclosure.

FIG. 4 is a flow diagram that illustrates an exemplary process 400 of receiving a user selection corresponding to an extension from a set of extensions, in accordance with an exemplary embodiment of the present disclosure. FIG. 4 is explained in conjunction with FIGS. 1, 2, and 3. In an embodiment, the process 400 may be implemented by the computing device 102.

In order to receive the user selection corresponding to the extension as mentioned via step 304, initially, at step 402, the set of extensions determined corresponding to the product may be presented to the user (i.e., the system integrator). As will be appreciated, the systems integrator may correspond to a person, a team, or firm who is specialized in assembling components into a whole and ensuring that those components work properly. By way of an example, the components may correspond to the plurality of components of the product that are integrated to develop the product at the time of manufacturing. By way of another example, the components may correspond one or more components of an extension that needs to be deployed by ensuring the extension works properly in conjunction with existing components (i.e., the plurality of components of the product).

The set of extensions may be presented to the user on a GUI (same as the GUI of the computing device 102). Further, upon presenting (or rendering) the set of extensions to the user, the user may be able to select the extension through the GUI that he wants to deploy. Further, at step 404, navigation may be provided to the user for guiding the user to select the extension from the set of extensions. In an embodiment, the navigation may be provided to the user based on an AI model (same as the AI engine 220) communicatively coupled to the computing device 102. In an embodiment, the AI model may be trained based on a training dataset to provide the navigation for guiding the user to select the extension. As will be appreciated, the guided navigation may enable the user to easily select the extension based on his requirement by restricting the user to think within a defined boundary of standards.

Figure 5:
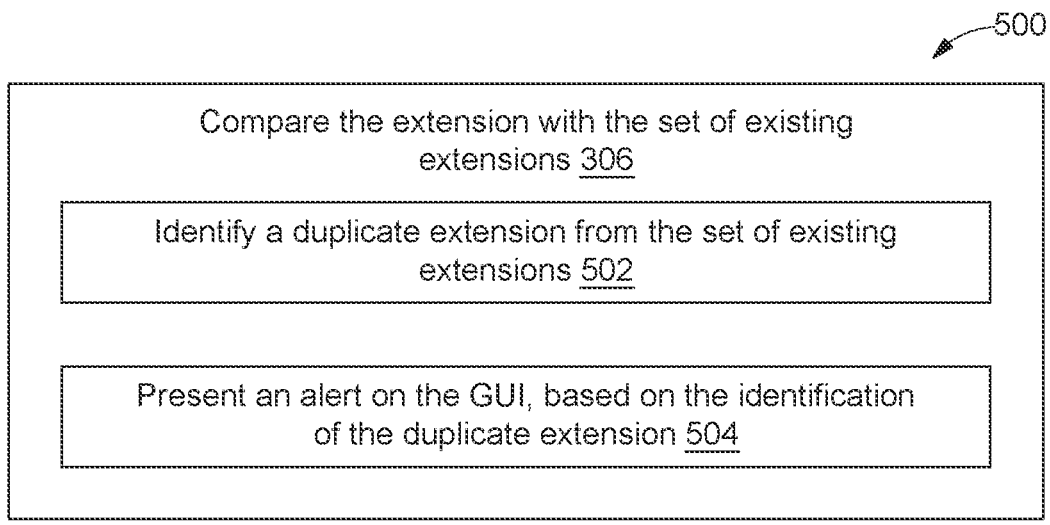
FIG. 5 illustrates a flow diagram of an exemplary process of comparing an extension with a set of existing extensions, in accordance with an exemplary embodiment of the present disclosure.

FIG. 5 is a flow diagram that illustrates an exemplary process 500 of comparing an extension with a set of extensions, in accordance with an exemplary embodiment of the present disclosure. FIG. 5 is explained in conjunction with FIGS. 1, 2, 3, and 4. In an embodiment, the process 500 may be implemented by the computing device 102.

With reference to FIG. 3, as mentioned via step 306, the comparison of the extension with the set of existing extensions may be performed to identify a duplicate extension from the set existing extensions at step 502. In an embodiment, each of the set of existing extensions may correspond to a pre-deployed extension, i.e., deployed on a server/client ecosystem. In particular, the comparison of the extension with the set of existing extensions may be done to identify if the duplicate extension exists corresponding to the extension. In an embodiment, the identification of the duplicate extension corresponding to the extension may be performed to ensure that none of the existing extension is same as the extension selected by the user. This is done to avoid re-deployment or override of the same extension. Further, based on the comparison, when the duplicate extension corresponding to the extension is identified, then at step 504, an alert may be presented to the user on the GUI of the computing device 102. In an embodiment, the alert may indicate that the duplicate extension is same as the extension. By way of an example, the alert generated upon identifying the duplicate extension corresponding to the extension may be 'selected extension already exists on intended environment/client ecosystem'.

Figure 6:
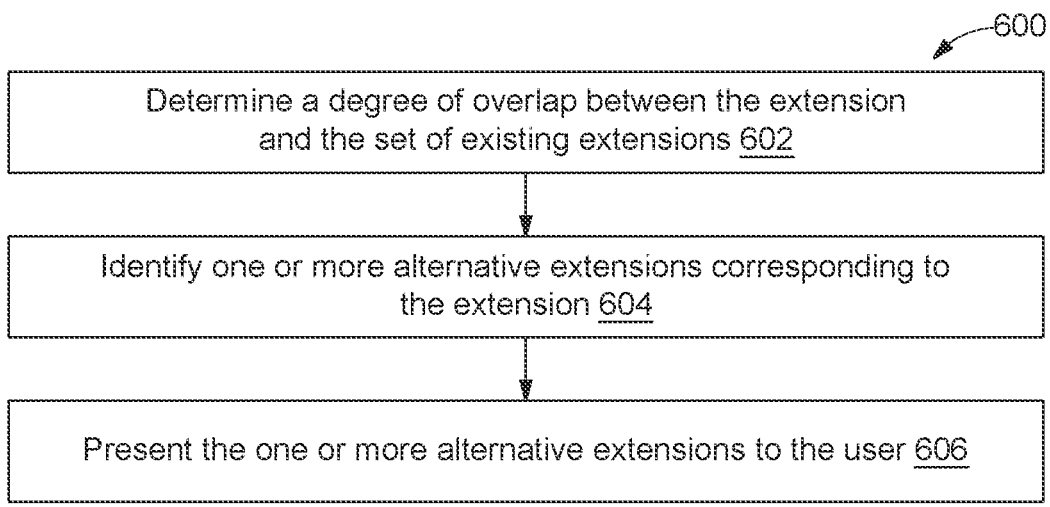
FIG. 6 illustrates a flow diagram of an exemplary process of identifying one or more alternative extensions corresponding to an extension, in accordance with an exemplary embodiment of the present disclosure.

FIG. 6 is a flow diagram that illustrates an exemplary process 600 of identifying one or more alternative extensions corresponding to an extension, in accordance with an exemplary embodiment of the present disclosure. FIG. 6 is explained in conjunction with FIGS. 1, 2, 3, 4, and 5. In an embodiment, the process 600 may be implemented by the computing device 102.

With reference to FIG. 3, as mentioned by step 306, the comparison of the extension with the set of existing extensions may be performed to determine a degree of overlap between the extension and the set of existing extensions, at step 602. In an embodiment, the degree of overlap may be determined between the extension and the set of extension by determining overlapping component from components of the selected extension with a set of components associated with each of the set of existing extensions. Once the degree of overlap between the extension and the set of extension is determined, then at step 604, one or more alternative extensions corresponding to the extension may be identified.

In an embodiment, the one or more alternative extensions corresponding to the extension may be identified based on the determined degree of overlap and a pre-defined overlap threshold. By way of an example, suppose the pre-defined overlap threshold may be set as 20 degrees. In this case, upon determining the degree of overlap between the extension and one or more of the set of existing extensions to be above 20 degrees, the one or more alternative extensions corresponding to the selected extension may be identified. In an embodiment, each of the one or more alternative extensions may correspond to an extension that is related to the selected extension.

Further, once the one or more alternative extensions corresponding to the extension are identified, then at step, the one or more alternative extensions may be presented to the user. In an embodiment, the one or more alternative extensions may be presented to the user via the GUI of the computing device 102. Further, upon presenting the one or more alternative extensions to the user, the user may be able to select an extension from the one or more alternative extensions, via the GUI of the computing device 102, based on his requirements.

Figure 7:
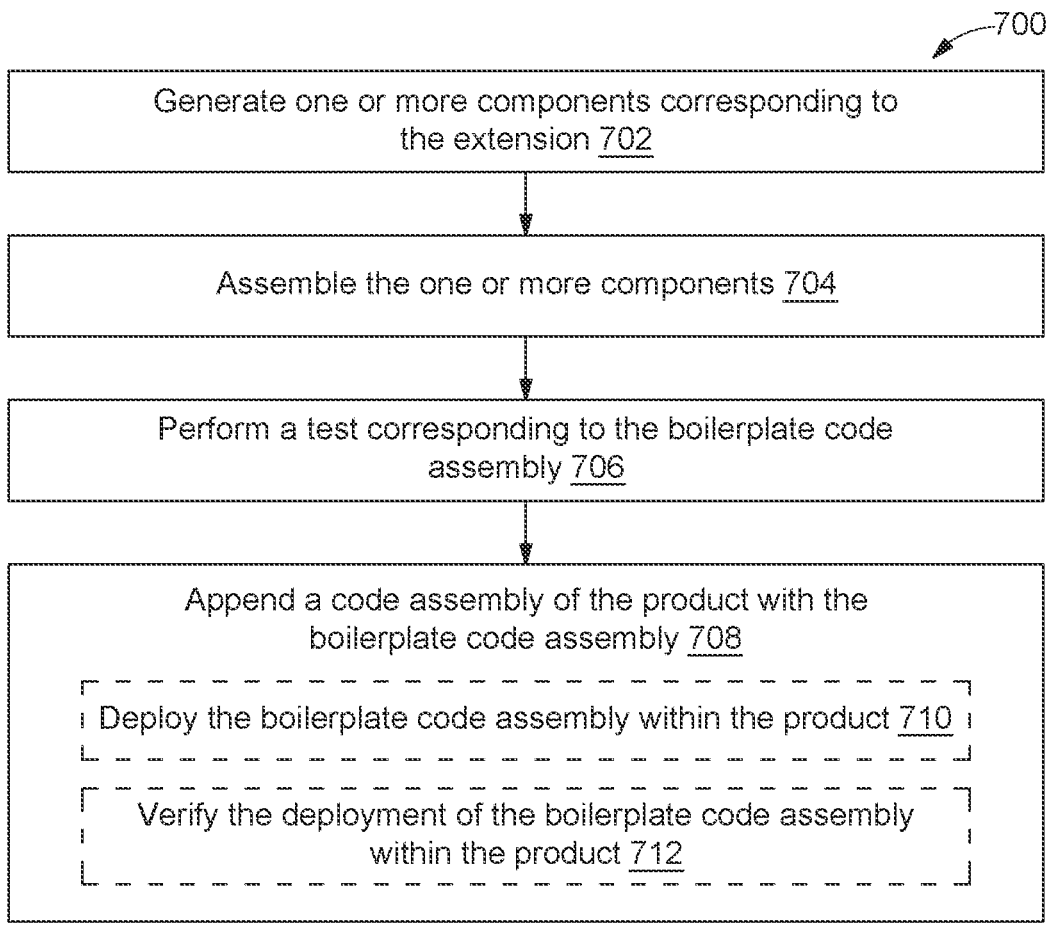
FIG. 7 illustrates a flow diagram of an exemplary process of generating boilerplate code assembly, in accordance with an exemplary embodiment of the present disclosure.

FIG. 7 is a flow diagram that illustrates an exemplary process 700 of generating boilerplate code assembly of an extension, in accordance with an exemplary embodiment of the present disclosure. FIG. 7 is explained in conjunction with FIGS. 1, 2, 3, 4, 5, and 6. In an embodiment, the process 700 may be implemented by the computing device 102.

In order to generate the boilerplate code assembly corresponding to the extension as mentioned via the step 308, initially, at step 702, one or more components corresponding to the extension may be generated. In an embodiment, the one or more components for the extension may be generated based on the business logic through the definition language template. As will be appreciated, the one or more components for the extension may be generated based on extension definition through the definition language template. In an embodiment, the definition language template may be used to generate the one or more components corresponding to the extension to ensure that each of the one or more components are generated leveraging patterns and standards defined by the product development team.

Further, the input corresponding to the business logic may be received from the user based on user requirement to enrich the boiler plate code assembly. As will be appreciated, the user may be able to provide the input corresponding to the business logic via the GUI or the input device (e.g., keyboard, mouse, joystick, and the like) associated with the computing device 102. Further, the input corresponding to the business logic may be provided based on comments and guidelines provided in the boilerplate code assembly which will help to maintain standards, patterns defined by the product development team By way of an example, when the product is associated with a banking domain, then the business logic that the user might be interested in implementing in an existing banking product, i.e., a banking application may be an open Fixed Deposit (FD) category. In this scenario, in order to implement this business logic through the extension, the boilerplate code assembly corresponding to this business logic may be generated using the computing device 102. Once the boilerplate code assembly is generated, then the input corresponding to this business logic may be provided by the user. By way of an example, the input provided corresponding to this business scenario may be 'generate open FD category'. As will be appreciated, in order to provide the input corresponding to the business scenario, the user may have to manually type a command, for example, 'create the open FD category' at a pre-defined location within the generated boilerplate code assembly.

Upon generating the one or more components corresponding to the extension, at step 704, the one or more components may be assembled based on the definition language template for generating the boilerplate code assembly corresponding to the extension. Further, during generation of the boilerplate code assembly, the auditability code snippet may be embedded within the boilerplate code assembly generated for the extension. It should be noted that, the auditability code snippet may include the observability code snippet. In an embodiment, the auditability code snippet may be embedded to verify conformance of extension to applicable quality gate standards and processes defined. In an embodiment, the observability code snippet may be embedded to measure the current state of the extension, post deployment.

Once the boilerplate code assembly corresponding to the product is generated, then at step 706, a test corresponding to the boilerplate code assembly may be performed. In an embodiment, the test may correspond to a sanity test. Further this sanity test may be performed in real-time while generating the boilerplate code assembly corresponding to the extension. As will be appreciated, the sanity test may be performed to ensure that the boilerplate code assembly generated for the extension is working properly without any bugs.

Further, based on an outcome of the test performed, at step 708, the code assembly of the product may be appended with the boilerplate code assembly generated for the extension. In particular, based on the outcome of the test performed, when the boilerplate code assembly is working properly without any errors, then the code assembly of the product may be appended with the boilerplate code assembly of the extension. In case, if any error is identified in functioning of the boilerplate code assembly based on the outcome of the test performed, then first the identified error may be resolved and the test may be performed again to ensure proper functioning of the boilerplate code assembly.

Further, in order to append the code assembly of the product with the boilerplate code assembly, at step 710, the boilerplate code assembly generated corresponding to the extension may be deployed in production requirement environment/client ecosystem. Once the boilerplate code assembly is deployed, then at step 712, the deployment of the boilerplate code assembly may be verified. As will be appreciated, the verification of the deployment and functioning of the boilerplate code assembly may be not only initially performed when the boilerplate code assembly is deployed but will also be periodically performed to ensure proper functioning of the extension. A method of verifying the deployment of the boilerplate code assembly is further explained in detail in conjunction with FIG. 8.

Figure 8:
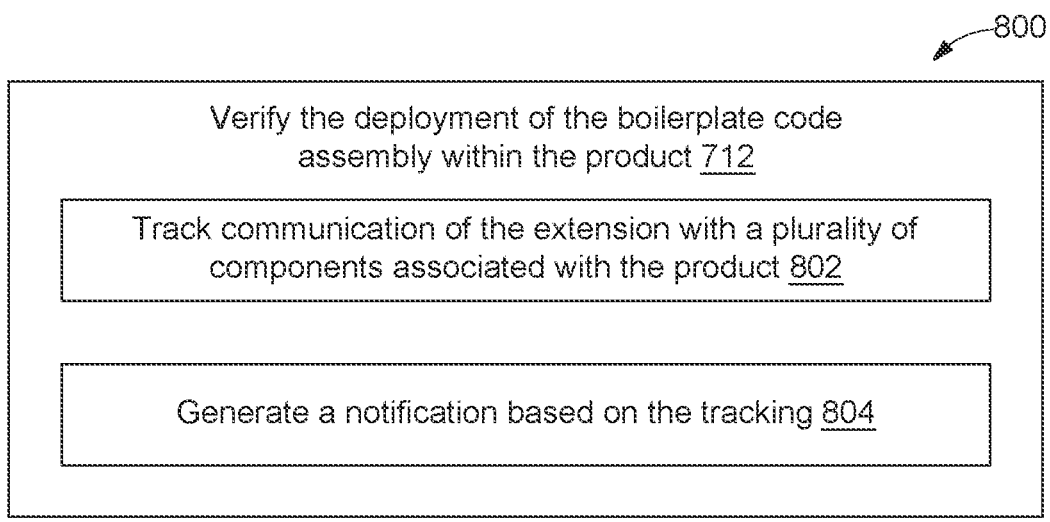
FIG. 8 illustrates a flow diagram of an exemplary process of verifying deployment of a boilerplate code assembly, in accordance with an exemplary embodiment of the present disclosure.

FIG. 8 is a flow diagram that illustrates an exemplary process 800 of verifying deployment of a boilerplate code assembly, in accordance with an exemplary embodiment of the present disclosure. FIG. 8 is explained in conjunction with FIGS. 1, 2, 3, 4, 5, 6, and 7. In an embodiment, the process 800 may be implemented by the computing device 102.

In order to verify the deployment of the boilerplate code assembly generated corresponding to the extension within the product, as mentioned via step 712, initially, at step 802, communication of the extension with the plurality of components associated with the product may be tracked. In particular, along with the deployment, the functioning of the boilerplate code assembly generated corresponding to the extension may also be verified. It should be noted that a component of the plurality of components may correspond to a software component (e.g., a new class) that encapsulates a set of functions configured for performing a specific task. In particular, the software component is a component that is designed to work as a part of a larger software application (i.e., the product). As will be appreciated, the product is developed by combining each of these components. In an embodiment, the tracking of the communication of the extension with the plurality of components may be done based on the auditability code snippet. It should be noted that, the auditability code snippet may be configured to analyzing the code assembly associated with the plurality of components of the product for bugs, errors, and state of the extension. As will be appreciated, the auditability code snippet may be configured to analyze the code assembly and enrichment areas that lags organization's (e.g., business entity) quality standard and process requirements.

Further, based on tracking of the communication, at step 804, a notification may be generated. In an embodiment, the notification may be indicative of one of a successful extension deployment, or an unsuccessful extension deployment. By way of an example, based on the tracking of the communications, when the extension appropriately functions in conjunction with the plurality of components of the product, then the notification depicting the successful extension deployment may be generated. By way of another example, when the extension does not function properly in conjunction with the plurality of components of the product, then the notification depicting the unsuccessful extension deployment may be generated. Further, this generated notification may be presented by the computing device 102 via the GUI to the user. Based on the presented notification, the user may be able to take appropriate action corresponding to the extension of the product.

Figure 9:
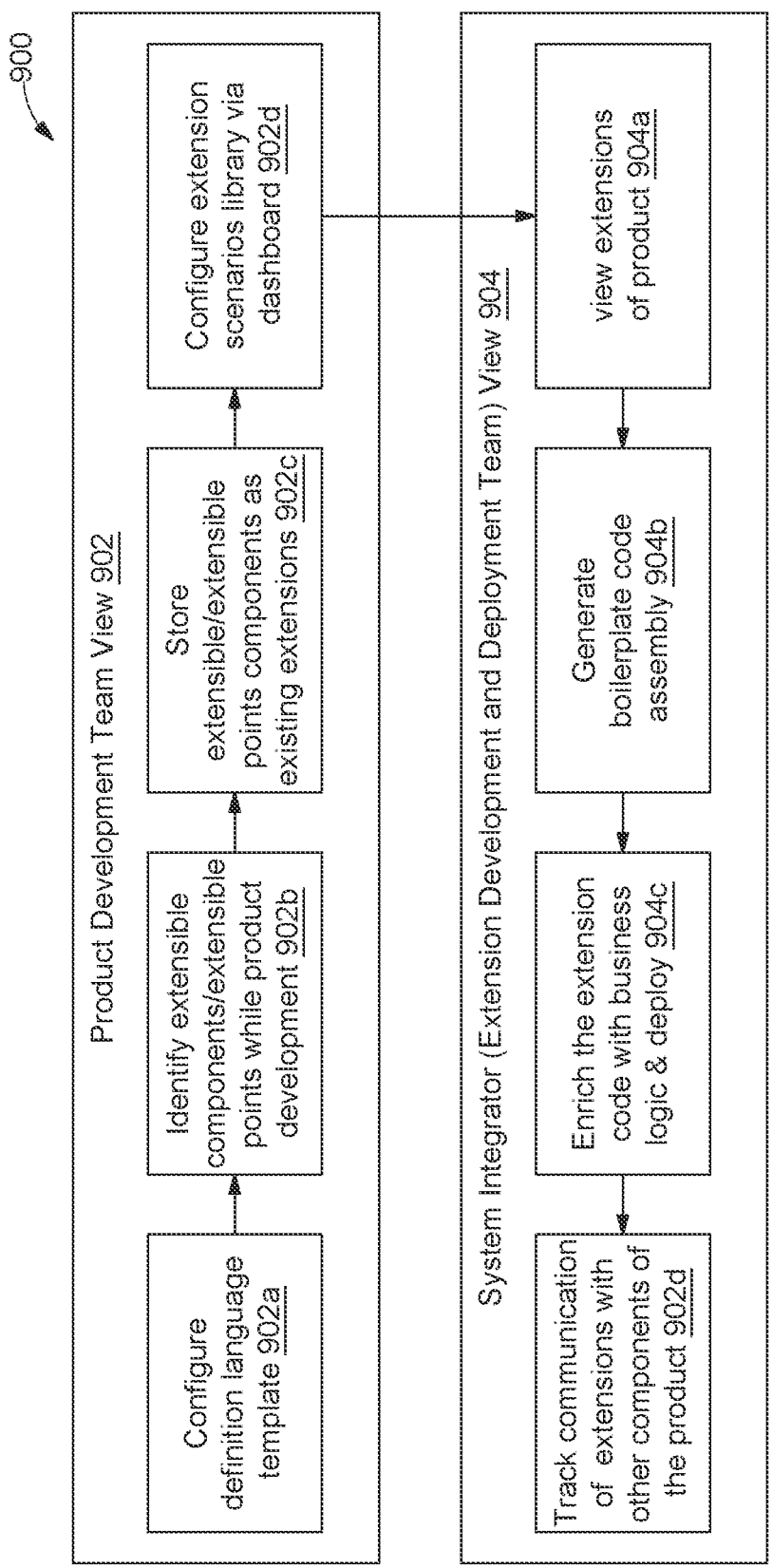
FIG. 9 illustrates an exemplary process flow diagram for managing extensions associated with a product, in accordance with an exemplary embodiment of the present disclosure.

FIG. 9 is a diagram that illustrates an exemplary process flow 900 for managing extensions associated with a product, in accordance with an exemplary embodiment of the present disclosure. FIG. 9 is explained in conjunction with FIGS. 1, 2, 3, 4, 5, 6, 7, and 8.

The exemplary process flow 900 represents a product development team view 902 and a system integrator view 904. The product development team view 902 may illustrate steps performed by team members of a product development team (same as the development team) while developing (or building) the product. In an embodiment, the product may correspond to a software product or a software application. In some another embodiment, the product may be a software platform. As will be appreciated, the product may be developed by developing the plurality of components associated with the product. It should be noted that each of the plurality of components may correspond to a software component (e.g., a new class) that encapsulates a set of functions configured for performing a specific task. In particular, the software component is a component that is designed to work as a part of a larger software application (i.e., the product). As will be appreciated, the product is developed by combining each of these components.

As will be appreciated, the product may belong to any industrial domain, such as retail, insurance, banking, telecom, and the like. As depicted via the product development team view 902, at step 902*a*, one or more members of the product development team may generate the definition language template, i.e., the pre-defined domain specific definition language template corresponding to the product, during development of the product. Once the definition language template is generated for the product, then at step 902*b*, the members of the product development team may identify extensible components or extensible points corresponding to the product. In other words, the extensible components may correspond to one or more of the plurality of components associated with the product whose functionality can be extended by developing an extension corresponding to that functionality.

Upon identifying the extensible components or the extensible points corresponding to the product, at step 902*c*, the extensible components or the extensible points determined corresponding to the product may be stored as existing extensions (i.e., the set of existing extensions) using the definition language template. Further, at step 902*d*, the member of the product development team may configure extension scenarios library via a dashboard. The dashboard may be associated with the product. In other words, the member of the product development team may configure the extension scenarios library as the extension configuration utility. Further, using the extension scenario library, the set of extensions corresponding to the product may be determined. In an embodiment, the set of extensions may include the set of existing extensions and the set of potential extensions.

Further, the system integrator view 902 may illustrate steps performed by a system integrator (i.e., the user) while deploying the extension associated with the product. In an embodiment, the system integrator may belong to an extension development and deployment team. As depicted via the system integrator view 904, the system integrator may be able to view the set of extensions corresponding to the product at step 904*a*. As will be appreciated, the system integrator may be able to view the set of extensions via the dashboard through the GUI of the computing device 102. Once the system integrator is able to view the set of extensions associated with the product, then the system integrator may select the extension from the set of extensions. Further, based on the selection of the extension, the comparison of the extension with the set of existing extensions may be performed. This has been already explained in detail in conjunction with above FIGS. 1 to 8.

Further, at step 904b, the boilerplate code assembly corresponding to the selected extension may be generated. As will be appreciated, during the generation of the boilerplate code assembly, the auditability and observability code snippet may be embedded within the boilerplate code assembly. Once the boilerplate code assembly corresponding to the extension is generated, then at step 904c, the boilerplate code assembly may be enriched with the business logic and deployed. In particular, the system integrator may provide the business logic corresponding to the boilerplate code assembly. Once the boilerplate code assembly may be enriched with the business logic, then the boilerplate code assembly corresponding to the extension may be deployed. In order to deploy the boilerplate code assembly corresponding to the extension, the code assembly already deployed and associated with the product may be appended with the boilerplate code assembly of the extension. Further, at step 904d, the communication of the extension with the plurality of components associated with the already deployed product may be tracked. Further, based on the tracking, the notification depicting whether the deployment of the extension with the product is successful (i.e., the successful extension deployment) or unsuccessful (i.e., unsuccessful extension deployment) may be generated and presented to the user. In an embodiment, the notification may be presented to the user via the GUI of the computing device 102.

Figure 10:
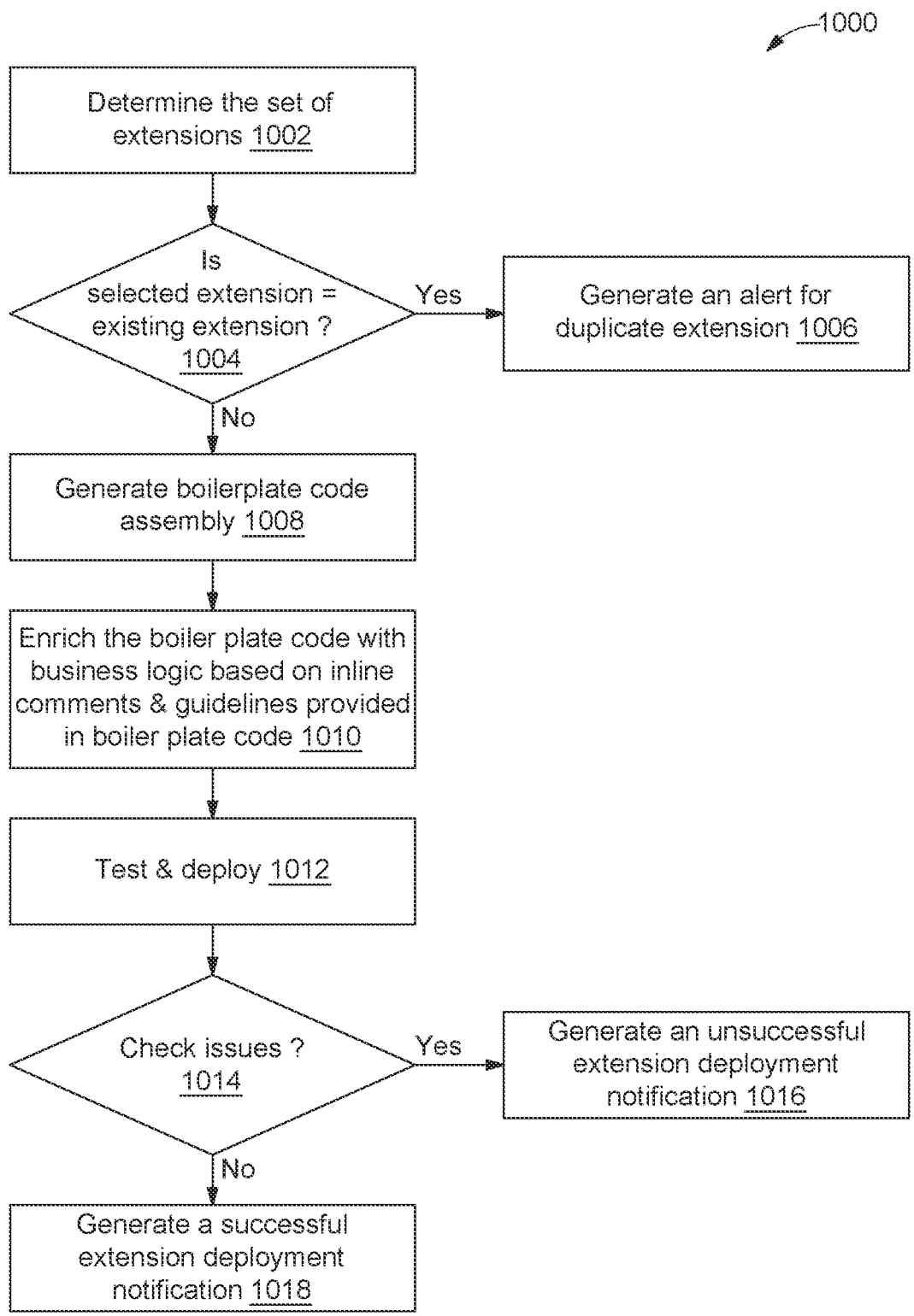
FIG. 10 illustrates a detailed flowchart of an exemplary process of managing extensions of a product, in accordance with an exemplary embodiment of the present disclosure.

FIG. 10 is a detailed flowchart that illustrates an exemplary process 1000 of managing extensions of a product, in accordance with an exemplary embodiment of the present disclosure. FIG. 10 is explained in conjunction with FIGS. 1, 2, 3, 4, 5, 6, 7, 8, and 9. In an embodiment, the process 1000 may be implemented by the computing device 102.

Initially, at step 1002, the set of extensions corresponding to the product may be determined. In an embodiment, the set of extensions corresponding to the product may be determined by the computing device 102. The set of extensions may include the set of existing extensions and the set of potential extensions. In an embodiment, the set of extensions may be determined using the extension configuration utility associated with the product. Once the set of extensions is determined, the set of extensions may be presented to the user (i.e., the system integrator) via the GUI of the computing device 102. Further, the user may be able to select the extension from the set of extensions presented to the user. Further, upon selecting the extension, at step 1004, a check may be performed to determine if the selected extension is same as an existing extension. In other words, the check may be performed to determine if the duplicate extension exists in deployment environment (client ecosystem) corresponding to the selected extension.

In one embodiment, when the duplicate extension corresponding to the selected extension is identified, then at step 1006, an alert may be generated. The alert may indicate that the duplicate extension is the same as the selected extension. In another embodiment, when the duplicate extension corresponding to the selected extension is not identified, then at step 1008, then the boilerplate code assembly corresponding to the extension may be generated. In an embodiment, the boilerplate code assembly may be generated using the definition language template. Upon generating the boilerplate code assembly, at step 1010, the boilerplate code assembly may be enriched with the business logic at right places by the system integrator, based on comments and guidelines provided in the boilerplate code assembly. In an embodiment, the input corresponding to the business logic may be received from the user. In some embodiment, the duplicate extension from the set of existing extensions corresponding to the extension, i.e., already deployed in deployment environment or client ecosystem, may be identified based on the determined degree of overlap. By way of an example, when the degree of overlap determined between the extension and an existing extension of the set of existing extensions is determined to be 100 degrees, i.e., exactly same, then that existing extension may be identified as the duplicate extension of the extension selected by the system integrator.

Further, at step 1012, the generated boilerplate code assembly may be tested to verify functional correctness of the generated boilerplate code assembly. In other words, the test (i.e., the sanity test) may be performed for the generated boilerplate code assembly. Once the generated boilerplate code assembly is tested, then the generated boilerplate code assembly may be deployed. In particular, the boilerplate code assembly may be deployed in intended deployment environment or client ecosystem. Once the boilerplate code assembly corresponding to the extension is deployed, then at step 1014, a check may be performed to verify the deployment of the boilerplate code assembly. In an embodiment, the check may be performed based on the auditability and observability code snippet embedded with the boilerplate code assembly while generating the boilerplate code assembly. In particular, in order to verify the deployment, the communication of the extension with the plurality of components of the product for bugs, errors, and state of the extension may be tracked. The code assembly and enrichment areas that lags organization's (e.g., business entity) quality standard & process requirements if any may be tracked.

Further, in one embodiment, based on the check performed, when the issue with respect to the deployment or functioning of the boilerplate code assembly is identified, then at step 1016, the notification representing the unsuccessful extension deployment or functioning may be rendered to the user. The notification representing the unsuccessful extension deployment or functioning may include details of interaction of the extension with each of the plurality of components based on which the user may be able to take suitable action. Further, in another embodiment, based on the check performed, when the issue with respect to the deployment and functioning of the boilerplate code assembly is not identified, then at step 1018, the notification representing the successful extension deployment may be rendered to the user. In other words, the notification representing the successful extension deployment and functioning may depict smooth product upgrade corresponding to the extension, during release of a new version of the product.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
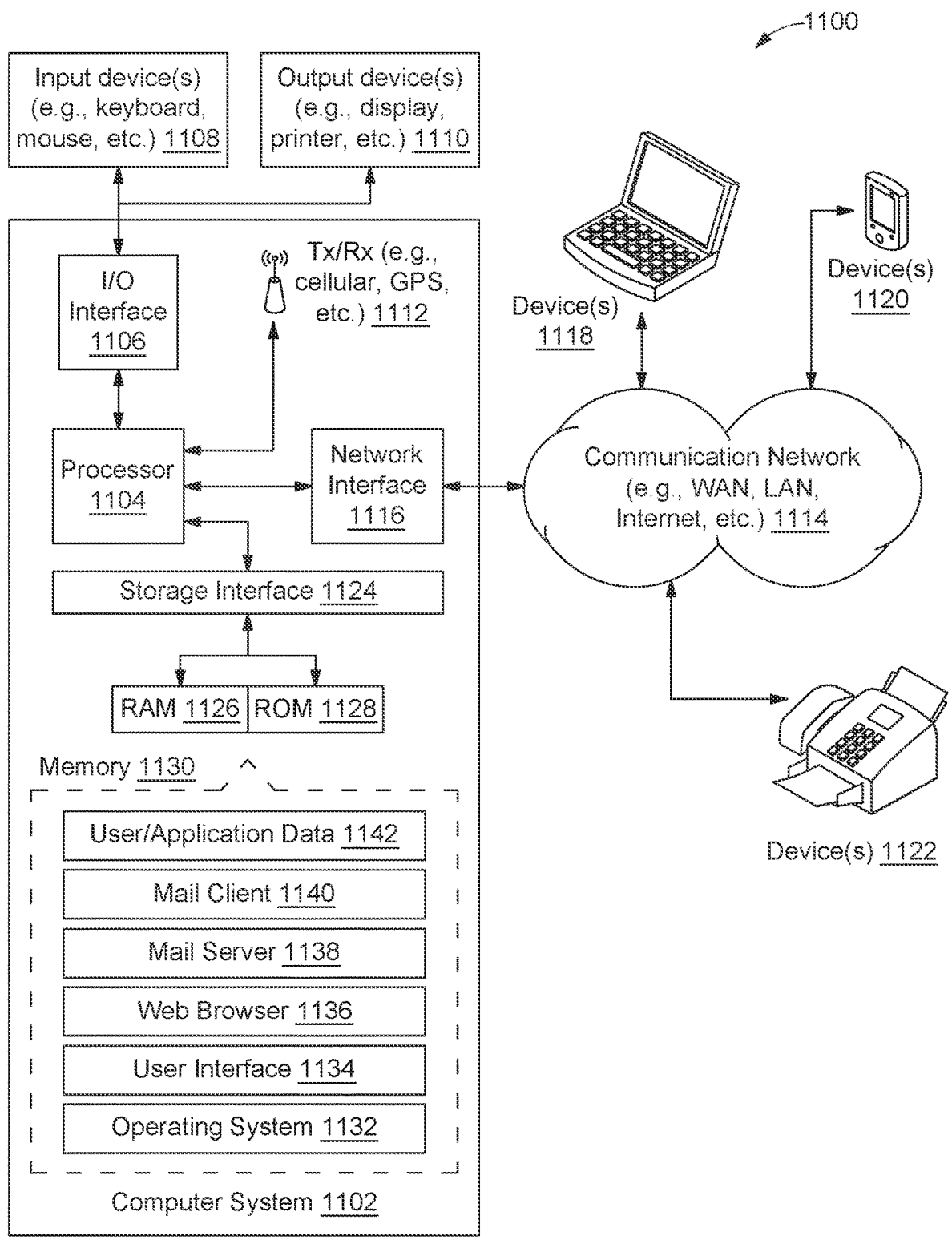
FIG. 11 is a block diagram that illustrates a system architecture of a computer system for managing extensions of a product, in accordance with an exemplary embodiment of the present disclosure.

The disclosed methods and systems may be implemented on a conventional or a general-purpose computer system, such as a personal computer (PC) or server computer. FIG. 11 is a block diagram that illustrates a system architecture 1100 of a computer system 1102 for managing extensions of a product, in accordance with an exemplary embodiment of the present disclosure. Variations of computer system 1102 may be used for implementing server 102 for managing anonymized data across computing devices in a blockchain network. Computer system 1102 may include a central processing unit ("CPU" or "processor") 1104. Processor 1104 may include at least one data processor for executing program components for executing user or system-generated requests. A user may include a person, a person using a device, such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. The I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8R® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of managing extensions of a product. The disclosed method and system may determine a set of extensions associated with the product. The set of extensions may include a set of existing extensions (i.e., pre-defined or pre-deployed extensions) and a set of potential extensions. Further, the disclosed method and system may receive a user selection corresponding to an extension from the set of extensions. In addition, the disclosed method and system may compare the extension with the set of existing extensions in intended deployment environment or client ecosystem. Thereafter, the disclosed method and system may generate a boilerplate code assembly corresponding to the extension in response to comparing. The boilerplate code assembly may be generated based on a definition language template, and a business logic.

As will be appreciated by those skilled in the art, the techniques described in the various embodiments discussed above are not routine, or conventional, or well understood in art. The techniques discussed above provide managing extensions of a product. The above discussed techniques may enable product development team of product companies to manage and publish extension mechanism for use of system integrators. Further, the above discussed technique may provide system integrators with a consistent, easy to use, and standard approach to extend product features (or functionalities) by easily generating extensions corresponding to a feature. In addition, the above discussed technique may enable the system integrators to rapidly build product extensions in a fast and efficient manner by providing a list of various extensions (i.e., the set of existing extensions/extension points) already available. Moreover, the above discussed technique may enable the system integrators to discover and deliver extension that are possible for the product in a fast and efficient manner, thereby increasing productivity and quality while implementing extensions for the products. In addition, the extension deployed using the above-mentioned technique will have a predefined standard and will use a consistent approach. This in turn will accelerate implementation of roadmap strategy of the extension and improve quality of the extension considerably.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a method and system for managing extensions of a product. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

I claim:

1. A method for managing extensions of a product, the method comprising:
   determining, by a computing device, a set of extensions associated with the product, wherein the set of extensions comprises a set of existing extensions and a set of potential extensions;
   receiving, by the computing device, a user selection corresponding to an extension from the set of extensions;
   comparing, by the computing device, the extension with the set of existing extensions;
   generating, by the computing device, a boilerplate code assembly corresponding to the extension in response to comparing, wherein the boilerplate code assembly is generated based on a definition language template and a business logic; and
   embedding, by the computing device, an auditability code snippet to the boilerplate code assembly generated for the extension.

2. The method of claim 1, wherein receiving the user selection corresponding to the extension comprises:
   presenting, by the computing device, the set of extensions on a GUI, wherein the extension is selected through the GUI.

3. The method of claim 2, further comprising:
   providing, by the computing device, navigation for guiding a user to select the extension from the set of extensions, wherein the navigation is provided based on an Artificial Intelligence (AI) model communicatively coupled to the computing device.

4. The method of claim 2, wherein comparing the extension with the set of existing extensions further comprising:
   identifying, by the computing device, a duplicate extension from the set of existing extensions; and
   presenting, by the computing device, an alert on the GUI, based on the identification of the duplicate extension.

5. The method of claim 4, wherein the alert indicates the duplicate extension is same as the extension.

6. The method of claim 4, further comprising:
   determining, by the computing device, a degree of overlap between the extension and the set of existing extensions; and
   identifying, by the computing device, one or more alternative extensions corresponding to the extension based on the determined degree of overlap and a pre-defined overlap threshold.

7. The method of claim 6, further comprising:
   presenting, by the computing device via the GUI, the one or more alternative extensions to the user.

8. The method of claim 1, further comprising:
   generating, by the computing device, one or more components corresponding to the extension based on the business logic through the definition language template; and
   assembling, by the computing device, the one or more components based on the definition language template for the generation of the boilerplate code assembly.

9. The method of claim 8, further comprising:
   performing, by the computing device, a test corresponding to the boilerplate code assembly; and
   appending, by the computing device, a code assembly of the product with the boilerplate code assembly based on an outcome of the performed test.

10. The method of claim 9, wherein appending the code assembly of the product with the boilerplate code assembly comprises:
    deploying, by the computing device, the boilerplate code assembly within the product; and
    verifying, by the computing device, the deployment of the boilerplate code assembly within the product.

11. The method of claim 1, wherein generating the boilerplate code assembly corresponding to the extension comprises:
    receiving, by the computing device, an input corresponding to the business logic based on user requirements, wherein the input is provided based on comments and guidelines provided in the boilerplate code assembly.

12. The method of claim 1, wherein verifying the deployment of the boilerplate code assembly comprises:
    tracking, by the computing device, communication of the extension with a plurality of components associated with the product, based on the auditability code snippet; and
    generating, by the computing device, a notification based on the tracking, wherein the notification is indicative of one of a successful extension deployment, or an unsuccessful extension deployment.

13. A system for managing extensions of a product, the system comprising:
    a processing circuitry; and
    a memory communicatively coupled to the processing circuitry, wherein the memory stores processor instructions, which when executed by the processing circuitry, cause the processing circuitry to:
    determine a set of extensions associated with the product, wherein the set of extensions comprises a set of existing extensions and a set of potential extensions;
    receive a user selection corresponding to an extension from the set of extensions;
    compare the extension with the set of existing extensions;
    generate a boilerplate code assembly corresponding to the extension in response to comparing, wherein the boilerplate code assembly is generated based on a definition language template and a business logic; and
    embed an auditability code snippet to the boilerplate code assembly generated for the extension.

14. The system of claim 13, wherein, to receive the user selection corresponding to the extension, the processor instructions, on execution, further cause the processing circuitry to:
    present the set of extensions on a GUI, wherein the extension is selected through the GUI; and
    provide navigation for guiding a user to select the extension from the set of extensions, wherein the navigation is provided based on an Artificial Intelligence (AI) model communicatively coupled to a computing device.

15. The system of claim 14, wherein, to compare the extension with the set of existing extensions, the processor instructions, on execution, further cause the processing circuitry to:
  identify a duplicate extension from the set of existing extensions; and
  present an alert on the GUI, based on the identification of the duplicate extension, and wherein the alert indicates the duplicate extension is same as the extension.

16. The system of claim 15, wherein the processor instructions, on execution, further cause the processing circuitry to:
  determine a degree of overlap between the extension and the set of existing extensions;
  identify one or more alternative extensions corresponding to the extension based on the determined degree of overlap and a pre-defined overlap threshold; and
  present via the GUI, the one or more alternative extensions to the user.

17. The system of claim 13, wherein the processor instructions, on execution, further cause the processing circuitry to:
  generate one or more components corresponding to the extension based on the business logic through the definition language template;
  assemble the one or more components based on the definition language template for the generation of the boilerplate code assembly;
  perform a test corresponding to the boilerplate code assembly; and
  append a code assembly of the product with the boilerplate code assembly based on an outcome of the performed test, wherein, to append the code assembly of the product with the boilerplate code assembly, the processor instructions, on execution, further cause the processing circuitry to:
  deploy the boilerplate code assembly within the product; and
  verify the deployment of the boilerplate code assembly within the product.

18. The system of claim 13, wherein, to verify the deployment of the boilerplate code assembly, the processor instructions, on execution, further cause the processing circuitry to:
  track communication of the extension with a plurality of components associated with the product, based on the auditability code snippet; and
  generate a notification based on the tracking, wherein the notification is indicative of one of a successful extension deployment, or an unsuccessful extension deployment.

* * * * *